(12) United States Patent
Ramakrishna

(10) Patent No.: US 7,648,540 B2
(45) Date of Patent: Jan. 19, 2010

(54) SYSTEM FOR PRODUCTION OF HYDROGEN WITH METAL HYDRIDE AND A METHOD

(75) Inventor: Natarajan Ramakrishna, Bangalore (IN)

(73) Assignee: Vellore Institute of Technology, Tamilnadu (IN)

( * ) Notice: Subject to any disclaimer, the term of this patent is extended or adjusted under 35 U.S.C. 154(b) by 339 days.

(21) Appl. No.: 10/542,550

(22) PCT Filed: Jan. 20, 2004

(86) PCT No.: PCT/IN2004/000014

§ 371 (c)(1),
(2), (4) Date: Apr. 24, 2006

(87) PCT Pub. No.: WO2004/065292

PCT Pub. Date: Aug. 5, 2004

(65) Prior Publication Data

US 2006/0257314 A1    Nov. 16, 2006

(30) Foreign Application Priority Data

Jan. 20, 2003    (IN)    .......................... 059/MAS/2003

(51) Int. Cl.
*B01J 7/00* (2006.01)
*H01M 8/06* (2006.01)

(52) U.S. Cl. ............................. 48/61; 48/118.5; 48/204; 423/657; 423/658.2; 423/644; 422/305; 422/209; 422/232; 422/233

(58) Field of Classification Search .................... 48/61, 48/118.5, 204, 197 R, 657; 423/657, 658.2, 423/644; 422/305, 209, 232, 233; *B01J 7/00; C10J 3/20, C10J 3/00, 3/46, 3/54; H01M 8/06; C01B 3/36*
See application file for complete search history.

(56) References Cited

U.S. PATENT DOCUMENTS

| | | | | |
|---|---|---|---|---|
| 2,721,789 A * | 10/1955 | Gill | ............................. | 422/202 |
| 4,466,808 A * | 8/1984 | Koog | ........................ | 48/197 R |
| 4,543,246 A * | 9/1985 | Houser | .................... | 423/648.1 |
| 4,988,486 A | 1/1991 | Harris et al. | | |
| 5,356,274 A * | 10/1994 | Lee | ............................. | 417/435 |
| 5,817,157 A | 10/1998 | Checketts | | |
| 6,800,258 B2 * | 10/2004 | Andersen et al. | ............. | 422/211 |
| 7,181,906 B2 * | 2/2007 | Betta et al. | ..................... | 60/286 |
| 2004/0047801 A1 * | 3/2004 | Petillo et al. | ................. | 423/657 |

* cited by examiner

*Primary Examiner*—Jerry Lorengo
*Assistant Examiner*—Heng M Chan
(74) *Attorney, Agent, or Firm*—Sughrue Mion, PLLC

(57) ABSTRACT

A system for production, storage and dispensation of hydrogen gas from encapsulated metal hydride, the system employing sealed cylinders filled with water and rotatable containers stored with encapsulated metal hydride shells, slider base members with passages and slider paths disposed at the bottom end of the cylinders to receive the encapsulated metal hydride shells from the containers, baffles disposed both inside and outside periphery of the rotatable containers to rotate the containers that regulate and direct the flow of the encapsulated metal hydride shells on to the slider paths, movable hydraulic ramming members with disintegration sites and pistons disposed at the bottom end of the slider paths, to receive the encapsulated metal hydride shells and disintegrate the encapsulated metal hydride shells and disperse the broken shells into the cylinders filled with water, and a control panel disposed to regulate the flow rate and pressure of the generated hydrogen gas.

21 Claims, 5 Drawing Sheets

SYSTEM FOR PRODUCTION OF HYDROGEN WITH METAL HYDRIDE AND A METHOD

FIELD OF INVENTION

The present invention relates to a system to produce, store and dispense hydrogen gas by metal hydride encapsulation. The present invention further relates to a method for the storage and dispensation of Hydrogen gas by using the system.

BACKGROUND AND PRIOR ART

Hydrogen is stored conventionally as a gas or liquid. Hydrogen, due to its very low density, it is stored at very high pressures (more than 3000 psi) or as liquid hydrogen at a very low temperature of −253° C. To increase the storage density of hydrogen the application of metal hydride is adopted as an alternative method. The alkali metals and alkaline earth metals and also some of their hydrides and mixed metal hydrides are also used to generate Hydrogen on reaction with water. Sodium Hydride is an inexpensive metal hydride that is produced in bulk and hence generally preferred for the storage of hydrogen.

The following are the some of the advantages of storing hydrogen in metal hydrides: eliminates high pressure and cryogenic temperature storage, eliminates carbon emission observed in reforming of Methane and Methanol, production of the desired quantity of hydrogen only when required, and recycling of metal hydroxide to produce metal hydride.

The hydrogen from metal hydride is produced either by heating metal hydride to above 400° C. or by reacting the metal hydride with water.

In heating process, the metal hydrides are extruded as rods, and are decomposed by heating them by means of electrical heaters or flue gas. The temperature for the decomposition is usually at about 400° C. The hydrogen is absorbed over the alkaline metal at high pressure and temperature.

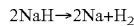

$2NaH \rightarrow 2Na + H_2$

The other alternate method of producing hydrogen is by reacting the metal hydride with water.

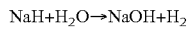

$NaH + H_2O \rightarrow NaOH + H_2$

In the case of reaction by decomposition the amount of hydrogen produced is about 50% less when compared with the reaction of metal hydride with water.

Metal Hydride Decomposition System in Automobiles

The requirement of pure hydrogen being a fundamental requirement in fuel cells or IC engines, the metal hydride rods have to be indirectly heated either by an electrical heater or by a flue gas. A separate energy source has to be provided for heating the metal hydrides, resulting in the occupation of more space in the automobile. Another limitation in the process is that factors pertaining to the production and absorption of Hydrogen vary during each recycling, since the metal hydride lattice starts cracking.

In a conventional hydrogen production system as depicted in FIG. 1 of the accompanied diagrams, wherein the reactor adopts the following reaction in a reactor:

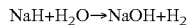

$NaH + H_2O \rightarrow NaOH + H_2$

In this process, wherein the sodium hydride in the form of a ball having lesser density than water floats up and the unbroken plastic balls (1.3) are cut into two pieces at the topside of the reactor (1.6) by means of ramming devices (1.5) to enable the sodium hydride to react with water to produce hydrogen. The broken (1.2) pieces float in the upper region of the reaction chamber (1.6). However, the limitation of this process is that if the metal hydride thus used is heavier than water, in such an event a separate reactor is required for high density metal hydrides. An alkali storage device (1.4) is disposed to collect alkali as a byproduct. In the above-stated process, the metal hydrides are first formed into a spherical ball of about ping pong ball size and coated with flexible polyethylene jacket made of the following polymeric materials, polyethylene, polypropylene, Kraton, SBR, Noryl, Peek etc. In the above-stated conventional process hydrogen storage device (1.1) is different from the reaction chamber (1.6).

Limitations encountered in the conventional water treatment processes include in an upside down reactor system, dispensing of the metal hydride ball cannot be adopted, if the metal hydride balls are heavier than water, mixed metal hydrides like NaAlH that are adopted in the conventional processes are not readily available. It is also expensive to manufacture NaAlH exclusively for metal hydride project to generate Hydrogen. Flexible polyethylene balls that are used to store metal hydrides, conventionally, do not open out but only get crushed, which may result in the malfunctioning of the dispensing system. Further, a separate hydrogen storage tank, that is adopted in reactor system, along with dispensing unit, results in duplication of safety and control systems in addition to the addition of other components.

Accordingly, in view of the above limitations, in the present invention, spherical ball flow dynamics and disintegration of low density materials have been studied. During the studies, it was observed that the conventional flexible plastic balls can be opened only when they are sliced into two pieces with sharp chisel like object. It is also further observed that when the brittle plastic balls are used for storing the metal hydrides, they disintegrate into small and tiny pieces, on impact with objects having blunt surfaces.

OBJECTS OF THE PRESENT INVENTION

Therefore, the primary object of the present invention is to provide a system that is unified and modular for the production, storage and dispensation of hydrogen gas.

An object of the present invention is also to provide a system that can handle metal hydrides lighter and heavier than water for the production of hydrogen.

Another object of the present invention is to provide a system that can serve both as a hydrogen dispenser and a storage unit in the form of a single system.

Yet another object of the present invention is to provide a system with metal hydride storage the capacity of which can be easily increased by attaching additional storage modules to enable automatic and continuous supply of hydrogen at a required pressure and flow rate.

It is also an object of the present invention to provide an encapsulated metal hydride with a flexible and brittle polymeric shell for hydrogen production.

Yet another object of the present invention is to provide a hydrogen gas which is about 99.9% purity.

Still another object of the present invention is to provide a method for production, storage and dispensation of hydrogen by using the system.

SUMMARY OF THE INVENTION

The present invention provides a system for production, storage and dispensation of Hydrogen gas by metal hydride encapsulation. The present invention further provides a method for the production, storage and dispensation of Hydrogen gas by the system.

BRIEF DESCRIPTION OF THE DIAGRAMS

DETAILED DESCRIPTION OF THE PRESENT INVENTION

Figure 1:
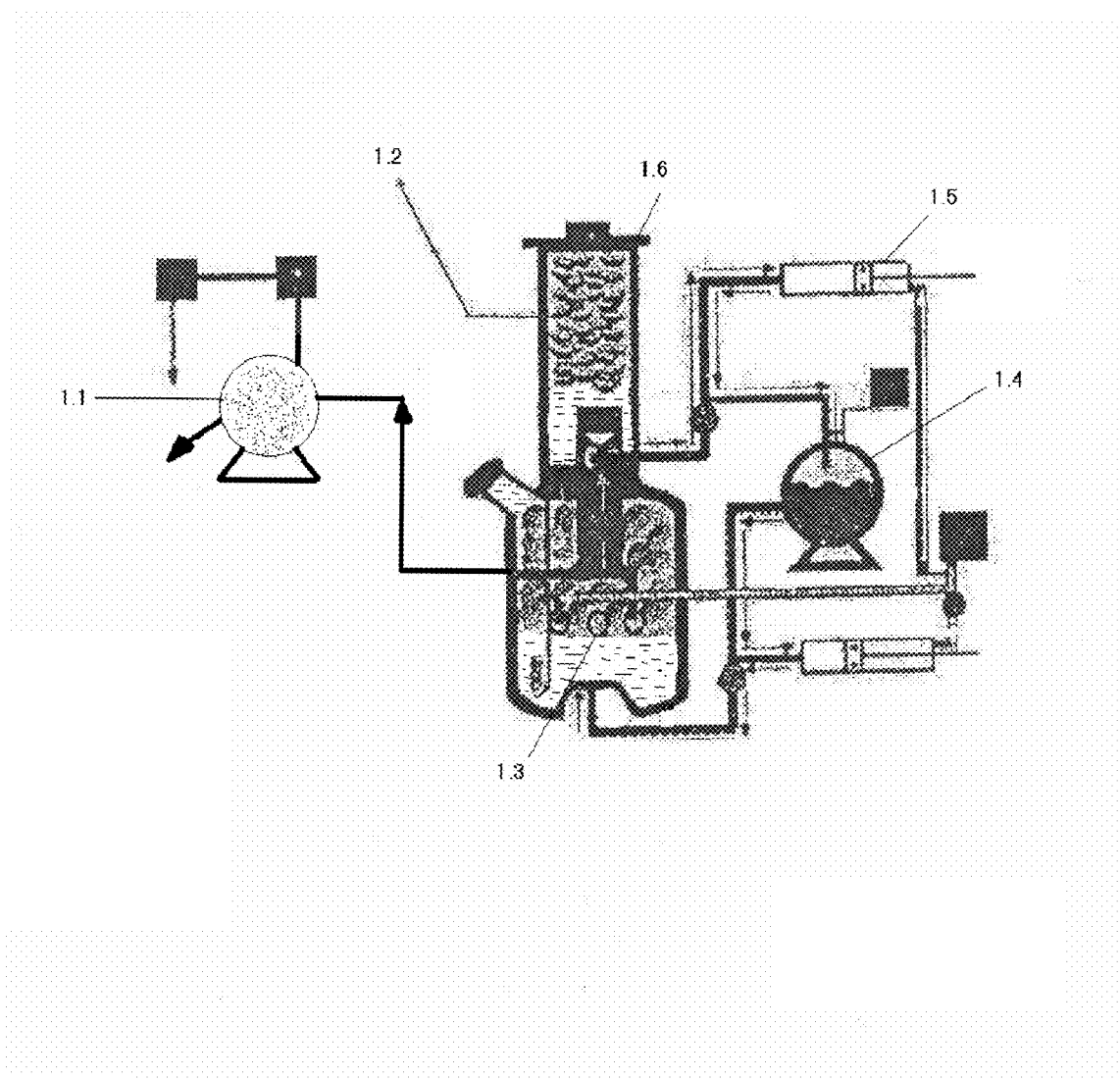
FIG. 1 depicts a conventional hydrogen production system.

The preferred embodiments of the present invention are explained now with reference to the accompanied diagrams. Initially, referring to FIG. 2, wherein a system of the present invention for the production, storage and dispensation of hydrogen gas is disclosed. A plurality of sealed and replaceable metallic cylinders (7a) mounted vertically on a platform by means of bolts. Hollow and dome shaped lids (7b) fixed on each of the cylinders (7a). A plurality of valves including pressure relief (13) are provided on the lids (7b) to control the pressure levels inside the cylinders (7a) during operation. Flush and fill valves (12) disposed on the lids (7b) of each of the cylinders (7a), as means for flushing the cylinders (7a) with water during cleaning and to fill the cylinders (7a) with water (6) before the sealing of the cylinders (7a). Pressure control switches (9) are used to control the internal pressure levels of the cylinders (7a). Rupture diaphragms (10) are fixed on the lids (7b) of the cylinders (7a) to release excess pressure and temperature levels. Outlets (1) disposed on the lids (7b) to provide an exit conduit for hydrogen gas produced in the process. Sealing means in the form of O-rings (14) are disposed between the top edge of the cylinders (7a) and bottom edge of the lids (7b). A pair of bolts (29) is used to seal the lids (7b) to the cylinders (7a). A perforated mesh (8a) is mounted in the meeting area of lids (7b) and the cylinders (7a) to provide peripheral casing. The description of the components of cylinders (7a) as provided herein would equally apply to all the cylinders of the system.

A pair of rotatable and replaceable containers (7) with funnel like inlets (8b) are provided to store encapsulated metal hydride shells (2). The containers (7) are fixed to the inner surface of the cylinders (7a), on both the sides, by supporting rings (16) with rollers (18) to provide a rotatable support to the containers (7). Plurality of encapsulated metal hydride shells (2) disposed in the containers (7). The shells (2) are fed into the containers (7) through the funnel like inlets before they are sealed and mounted on the platform.

Slider base members (22) disposed at the bottom end of the cylinders (7). The slider base members (22) are fixed to the inner surface of the cylinders, on both the sides, by supporting rings (23). The slider base members (22) act as bottom to the containers (7). The slider base members (22) having a passages (21), the passages in flow communication with a slider paths (20) to transmit the encapsulated metal hydride (2) shells from the containers (7) into the cylinders (7a).

A plurality of baffles (17 & 19) disposed both inside and outside periphery of the rotatable containers (7a). The inner baffles (19) adapted to regulate and direct the flow of the encapsulated metal hydride shells (2) of the containers (7) on to the slider path (20) through the passages (21) of the slider bases (20) and the outer baffles (19) adapted to rotate the containers (7).

A pair of movable hydraulic ramming members (11a) with hydraulic cylinders (26a and 26b), movable pistons (11) and hollow ends (3) connected to the cylinders (7a) and extending plane perpendicular to the pair of cylinders (7a), where the cylinders (7a) are symmetrically positioned. Hydraulic ramming members (11a) are used to connect a plurality of cylinders (7a) that are connected in series. Hydraulic ramming members (11a) disposed at the bottom end of the slider path (20), include disintegrating sites (25) and hollow cavities (24) to receive the encapsulated metal hydride shells (2) from the slider passages (21). The movable pistons (11) with blunt ends are disposed for the disintegration of the encapsulated metal hydride shells (2) at the disintegrating sites (25). The broken shells and metal hydride are permitted to fall into the cylinders (7a) from the disintegrating sites (25).

Motion transmitting elements (22a), which are levers, mounted on the movable hydraulic ramming members (11a) and connected to the outside baffles (19) of the containers (7). The axial movement of the movable hydraulic ramming members (11a) is transmitted to the motion transmitting element (22a), which is further converted into a rotatable action of the containers (7) by means of the outside baffles (19).

Outlets (27) at the bottom of the cylinders (7a) to release by products like NaOH, broken pieces of metal hydride (5), and water (6). The control of the outlets (27) is done by means of valves (28).

Figure 3:
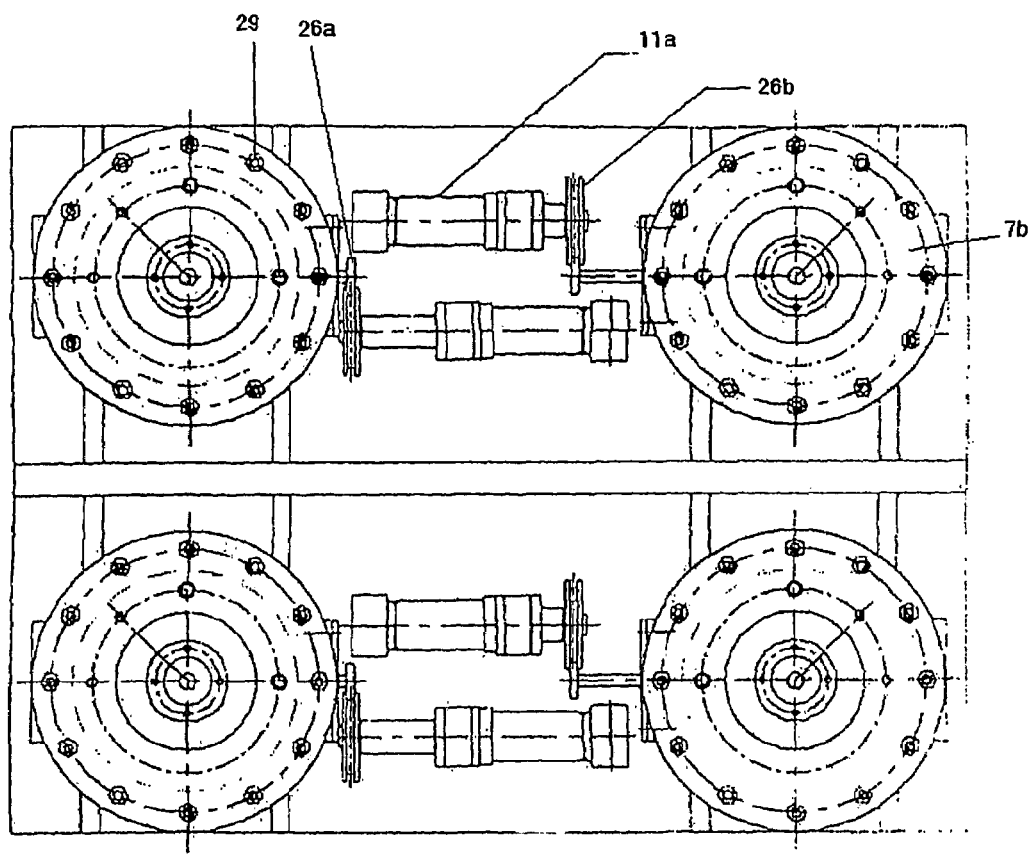
FIG. 3 is a hydrogen regulator interface of the system of the present invention.

Now by referring to FIG. 3, which depicts a top view of the system, involving a series of cylinders (7a) connected by means of hydraulic ramming members (11a).

Figure 2:
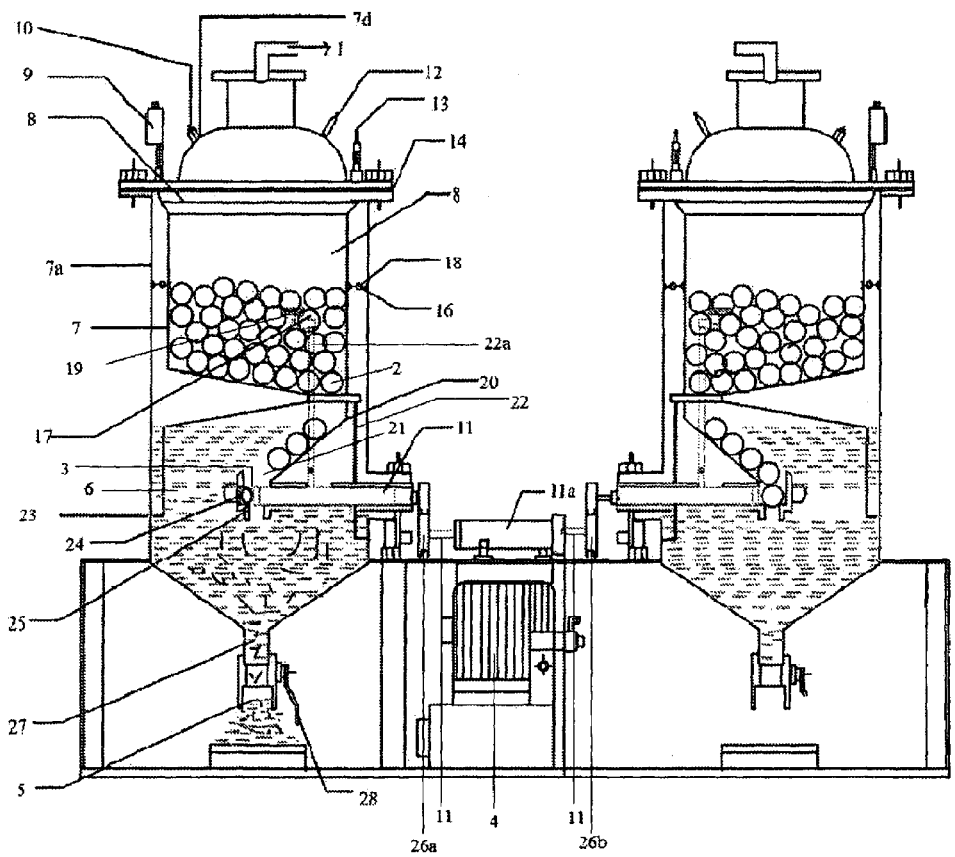
FIG. 2 is hydrogen production, storage and dispensation system of the present invention.
Figure 4:
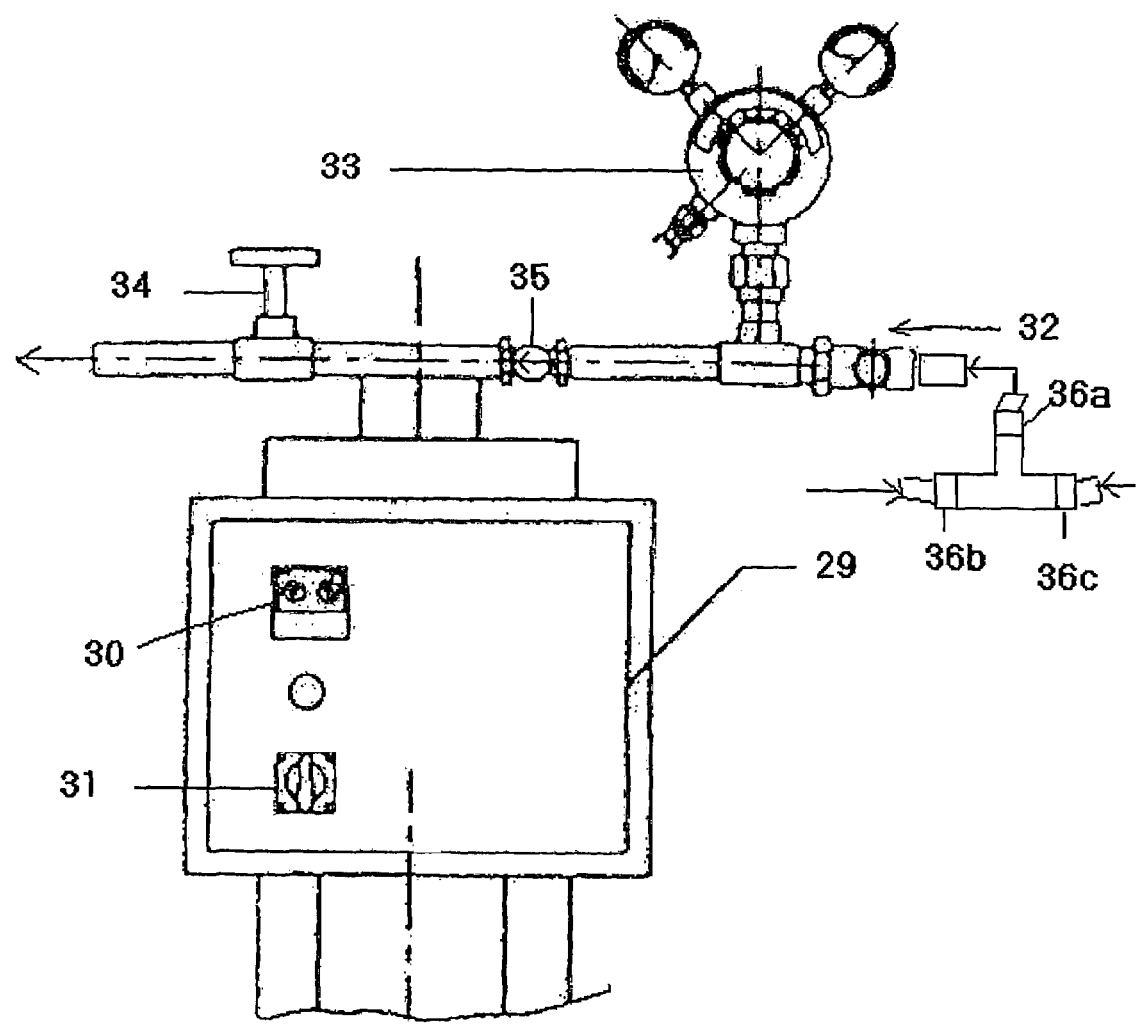
FIG. 4 is cross section view of the manifold connectivity of cylinders for an enhanced hydrogen supply FIG. 5 a view of the containers with baffles for regulating the encapsulated metal hydrides.

FIG. 4 discloses a control panel (29) with time and change over switches (30 & 31) to control the selection of cylinders (7a) as desired. The outlets (1) (as shown in FIG. 2) originating from various cylinders (7a) are connected to "T" connection (36b and 36c) and connected to a pipe with valve (32) through connection (36a). The hydrogen flow rate is controlled by hydrogen pressure regulator (33). The regulated hydrogen gas is sent out by means of valves (32), (34) and (35) for further use.

Figure 5:
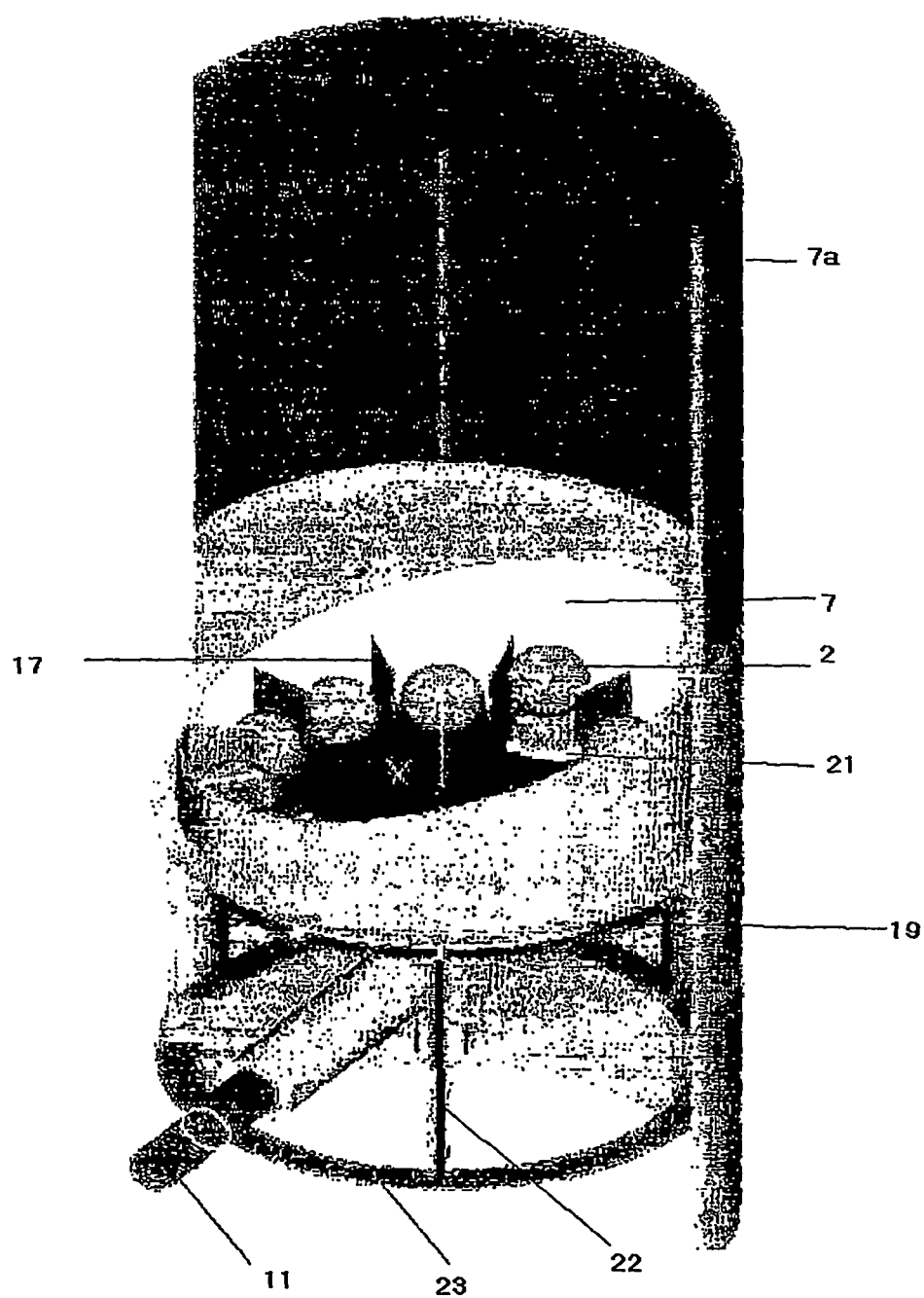

Now by referring to FIG. 5, which is a cross section of the container (7) and cylinder (7a) showing internal and external baffles (17&19) along with the encapsulated metal hydride shells (2). Passages (21) which are connected to slider path (20) (not shown in this figure) to permit the passage of the encapsulated metal hydride shells (2) into the containers (7).

A motor (4) mounted on the platform provides power to hydraulic ramming members (11a) and for the rotation of the containers (7a). The preferred embodiments of the present invention are further explained as follows:

An embodiment of the present invention, wherein the system can handle multiple containers to meet the demand of hydrogen productivity.

Another embodiment of the present invention, wherein the containers are made of material selected from mild steel and stainless steel.

Yet another embodiment of the present invention, wherein the inner surfaces of the containers are optionally coated with protective coating material selected from polyethylene, epoxy and polyester.

Still another embodiment of the present invention, wherein the conical containers used for feeding and storing the encapsulated metal hydrides are disposed at an angle in the range of 30-80° to get an uninterrupted and selected flow of encapsulated metal hydride materials to the disintegration site.

Further embodiment of the present invention, wherein the system handles both low and high density encapsulated metal hydride shells.

Further embodiment of the present invention, wherein the hydraulic ramming members having preferable hollow heads on the sides to facilitate the holding of metal hydride shells during crushing.

Still another embodiment of the present invention, wherein the hydraulic ramming members crush the metal hydride shells into small and tiny debris that are collected at the bottom of the containers for easy disposal and recycling.

Still another embodiment of the present invention, wherein the accumulation of disintegrated pieces of encapsulated metal shells facilitates in creating a space in the containers for storing and dispensing of hydrogen.

Yet another embodiment of the present invention, wherein the encapsulated metal hydride shells having shapes selected from spherical, cylindrical, rectangular and square, spherical.

Further embodiment of the present invention, wherein the intervening gaps among the encapsulated metal hydride shells are utilized as an additional storage for the hydrogen gas.

Still another embodiment of the present invention, wherein the encapsulation of metal hydrides is done using the polymeric material selected from polystyrene, poly methyl methacrylate (PMMA), PVC with less plasticizer, HDPE, brittle poly olefins, preferably polystyrene and PMMA.

Yet another embodiment of the present invention, wherein the encapsulated metal hydride shells are sealed initially with solvents selected from chloroform, acetone, carbon tetra chloride and alcohol.

Still another embodiment of the present invention, wherein the encapsulated metal hydrides are further sealed with instant sealants.

Further embodiment of the present invention, wherein the hydraulic power means having a hydraulic seal is placed at the bottom of the system not only to prevent the leakage from the system but also to have a multi-containers dispensing system. The hydraulic power means is a hydraulic mechanism, which is described by referring to FIGS. 2 & 3. Hydraulic pack as used in the present invention is a general hydraulic device including a sump containing a hydraulic fluid and pump (not shown in the figures) connected to motor (4). The movable ramming members (11a) with pistons (11) and hydraulic cylinders (26b and 26b) are driven by the motor (4) to provide a reciprocal movement to the movable hydraulic ramming members (11a). The hydraulic cylinders (26b) driven by the motor (4) impart reciprocal motion to the ramming members (11a). The hydraulic cylinders (26b) are also provided with suitable sealing mechanism to prevent leakage during the reciprocating motion of the pistons (11). The reciprocal movement of the hydraulic ramming members (11a) is regulated by the control panel (29) depending on the flow requirement of the hydrogen gas, by disintegrating the encapsulated metal hydride shells (2) with pistons (11) of said hydraulic ramming members (11a). The hydraulic ramming members (11a) are connected to each of the containers (7), which are disposed inside the cylinders (7a). The reciprocal movement of the hydraulic ramming members (11a) is regulated by the control panel (29) depending on the flow requirement of the hydrogen gas, by disintegrating the encapsulated metal hydride shells (2) with pistons (11) of the hydraulic ramming members (11a). Therefore, the system of the present invention can be adapted to have a connection of multiple-cylinders (7a) connected to and operated by the hydraulic ramming members (11a) for the production of hydrogen gas.

Further embodiment of the present invention, wherein the system is adapted for manifold containers and the encapsulated metal hydride shells can be disintegrated simultaneously depending on the demand for hydrogen gas.

Yet another embodiment of the present invention, wherein the system is designed to enable the swapping of empty containers with filled containers with ease preventing the exposure to the chemicals.

Yet another embodiment of the present invention, wherein the hydrogen outlets are provided with non-return valves, pressure control valves and flow control valves.

In another embodiment of the present invention, the present invention also provides a method for the production, storage and dispensation of hydrogen by using the system of the present invention, the method comprising the steps of;

(a) mounting the sealed cylinders on the platform filled with a proportionate quantity of water and a containers with encapsulated metal hydrides, (b) directing the encapsulated metal hydride into the hydraulic ramming members by means of baffles disposed in the containers and crushing the desired quantities of encapsulated metal hydride shells to disintegrate into small pieces;

(c) dispersing the metal hydride into the water;

(d) reacting the metal hydride with water to produce hydrogen;

(e) releasing the hydrogen through outlet means provided at the top of the cone and containers; and (f) collecting the disintegrated pieces and the byproducts at the bottom of the containers.

An embodiment of the method wherein, the metal content for metal hydride is selected from Sodium, Boron, Lithium, Potassium and magnesium with an addition aluminum powder, or any metal hydride capable of releasing hydrogen, preferably sodium hydride.

Another embodiment of the method wherein the plurality of cylinders disposed for simultaneous disintegration of enhanced number of encapsulated metal hydrides for the production of hydrogen gas.

Yet another embodiment of the method wherein the aluminum that is used in powder form is in the range of 5-50% to increase the density of the metal hydride and also to produce more hydrogen per unit volume by reacting with an alkali, preferably sodium.

Still another embodiment of the method wherein the byproducts consisting of NaOH and alumina.

Further embodiment of the method wherein the exothermic reaction condition of the process provides the desired temperature range for the formation alumina.

Yet another embodiment of the method wherein the reaction of metal hydride takes place under controlled pressure and temperature.

Still another embodiment of the present invention, wherein both low and high density encapsulated metal hydride shells can be used for production, storage and dispensation of hydrogen gas.

Yet another embodiment of the present invention, wherein the purity of the hydrogen thus produced is 99.99% purity, which can be fed directly for usage in fuel cell or in IC engines.

Further embodiment of the present invention, wherein the reaction of metal hydride takes place at room temperature and pressure.

The present invention also provides an encapsulated metal hydride shells, the encapsulated metal hydrides comprising;

(a) a metal hydride core;

(b) an encapsulated brittle and impermeable polymeric material; and (c) sealed encapsulated metal hydride;

An embodiment of the present invention, wherein the metal content for metal hydride is selected from the group consisting of Sodium, Boron, Lithium, Potassium and magnesium.

Another embodiment of the present invention, wherein the alkaline earth metal is Calcium.

Yet another embodiment of the present invention, wherein the alkali hydrides are selected from Sodium Hydride, Boron Hydride and Lithium Hydride, and preferably Sodium Hydride.

Further embodiment of the present invention, wherein the mixed metal hydrides are selected from Lithium Aluminum Hydride and Sodium Aluminum Hydride and Sodium Boron Hydride.

Yet another embodiment of the present invention, wherein the other Hydrides are selected from Titanium Iron Hydride (TiFeH), Missmetal Hydride (MhH), Magnesium Hydride (MgHz) and Magnesium Nickel Hydride (MgNiHz, MgNiH4).

Yet another embodiment of the present invention, wherein the metal hydride shells having shapes selected from spherical, cylindrical, rectangular and square, preferably spherical.

Further embodiment of the present invention, wherein the encapsulation of metal hydride shells is done using the polymeric material selected from polystyrene, poly methyl methacrylate (PMMA), PVC with less plasticizer, HDPE, brittle poly olefins, preferably polystyrene and PMMA.

Yet another embodiment of the present invention, wherein the encapsulated metal hydride shells are sealed initially with solvents selected from chloroform, acetone, carbon tetra chloride and alcohol.

Still another embodiment of the present invention, wherein the encapsulated metal hydride shells are further sealed with instant sealants.

Yet another embodiment of the present invention, wherein the encapsulated metal hydride shells are made in an inert atmospheric pressure using a dye and then coated with polymeric metals in the desired solvents or with molten brittle polymeric materials.

A process for the manufacture of encapsulated metal hydride shells, the process comprising;

(a) preparing the metal hydride palettes;

(b) coating the palettes with revolving spiral device consisting of molten polymer or a polymer dissolved in a solvent; and (c) curing a coating to form an impermeable plastic shell.

ADVANTAGES OF THE PRESENT INVENTION

1. The system of the present invention provides for an enhanced storage and dispensation of hydrogen at required temperature and pressure conditions.
2. In the present invention a single metal hydride system is used for both storage and dispensation of Hydrogen.
3. The hydrogen storage is in the form of selected metal hydride in encapsulated and brittle polymeric shells.
4. The metal hydrides of the present invention are also easy to handle.
5. The disintegrated pieces of the encapsulated metal hydride shells reach the bottom portion of the containers not only to facilitate an upper free zone of the containers for Hydrogen occupation but also for the easy removal of disintegrated pieces from the bottom portion of the containers.
6. The hydrogen gas thus produced has applications in Automobile industry, Metrological applications, power systems in isolated locations, where the systems are not connected to the grid, generation of power with negligible noise, hydrogenation of oils and organic reactions wherever the hydrogen is required.
7. Dispensing of hydrogen at desired pressure and flow rate is made feasible.

The invention claimed is:

1. A system for the production, storage and dispensation of hydrogen, said system comprising:

(a) at least a pair of sealed and replaceable cylinders filled with water mounted vertically on a platform, (b) rotatable and replaceable containers with outlets to store encapsulated metal hydride shells with intervening gaps, said containers fixed to the inner surfaces of said cylinders, on both the sides, by supporting rings with rollers to provide a rotatable support, (c) lids having moist separation mesh serving as passages for hydrogen flow, fixed on top of said cylinders, wherein said lids disposed as inlet means for encapsulated metal hydride shells and water before said cylinders are sealed and mounted on the platform, (d) slider base members disposed at the bottom end of said cylinders, said slider base members fixed to the inner surface of said cylinders, on both the sides, by supporting rings, (e) said slider base members act as bottoms to the containers, said slider base members having passages, said passages in flow communication with slider paths to transmit the encapsulated metal hydride shells from said containers into the cylinders, (f) a plurality of baffles disposed both inside and outside periphery of said containers, said inner baffles adapted to regulate and direct the flow of said encapsulated metal hydride shells of said containers on to said slider path through said passages of the slider base members and said outer baffles adapted to rotate said containers, (g) a pair of movable hydraulic ramming members with pistons extending plane perpendicular to said containers disposed at the bottom end of the slider path, said ramming members including disintegrating sites to receive the encapsulated metal hydride shells from the slider passages and said movable pistons disposed to disintegrate said encapsulated metal hydride shells and disperse metal hydride and broken shells into said cylinders, wherein said hydraulic ramming members connected to hydraulic cylinders and hydraulic power means, (h) motion transmitting elements mounted on said ramming members and connected to said outer baffles to provide corresponding rotatable action to said containers, and (i) outlets disposed on the lids of the cylinders to release the hydrogen thus produced in the cylinders, and (j) a control panel to control the operations of the system.

2. The system as claimed in claim 1, wherein said cylinders consisting of valves at the bottom end to control the flow of the water, disintegrated shells along with by-products.

3. The system as claimed in claim 1, wherein the lids are elevated and hollow with rupture diaphragms.

4. The system as claimed in claim 1, wherein optionally a plurality of said cylinders and containers is connected in series for hydrogen production, storage and dispensation.

5. The system as claimed in claim 1, wherein said cylinders and containers are made of mild steel or stainless steel.

6. The system as claimed in claim 1, wherein the metal content for metal hydride is selected from Sodium, Boron, Lithium, Potassium and magnesium with aluminum or any metal hydride capable of releasing hydrogen.

7. The system as claimed in claim 1, wherein the shapes of encapsulated metal hydride shells are spherical, cylindrical, rectangular and square, preferably spherical.

8. The system as claimed in claim 1, wherein the encapsulation of metal hydrides is by a polymeric material selected from polystyrene, poly methyl methacrylate (PMMA), PVC with less plasticizer, HDPE, brittle poly olefins, preferably polystyrene and PMMA.

9. The system as claimed in claim 1, said hydraulic power means consisting of a hydraulic pack and the hydraulic cylinders with suitable sealing mechanism to prevent leakage during reciprocating motion of the piston while disintegrating the encapsulated metal hydride shells.

10. The system as claimed in claim 1, wherein the control panel is controlled by analogues or digital devices.

11. The system as claimed in claim 1, wherein the outlets of the containers consisting of outlet valves, which are sealed and opened only during refilling, to prevent accidental spillage.

12. The system as claimed in claim 1, wherein the inner baffles are used to provide an uninterrupted and selected flow of encapsulated metal hydride materials to the disintegration site.

13. The system as claimed in claim 1, wherein the pistons of the ramming members crush the metal hydride shells into small and tiny debris that are collected at the bottoms of the containers for easy disposal and recycling.

14. The system as claimed in claim 1, the accumulation of disintegrated pieces of encapsulated metal shells facilitates in creating a space in the containers for storing and dispensing of hydrogen.

15. The system as claimed in claim 1, wherein the intervening gaps among the encapsulated metal hydride shells in the containers are utilized as an additional storage means for the hydrogen gas.

16. A method for the production, storage and dispensation of hydrogen by using the system as claimed in claim 1, said method comprising the steps of;
   (a) mounting the sealed cylinders on the platform filled with a proportionate quantity of water and the containers with encapsulated metal hydrides,
   (b) directing the encapsulated metal hydride shells into the disintegrating sites of the hydraulic ramming members with pistons by means of the inner baffles disposed in the containers and crushing the desired quantities of encapsulated metal hydride shells to disintegrate into small pieces,
   (c) dispersing the metal hydride and disintegrated pieces into the water,
   (d) reacting the metal hydride with water to produce hydrogen and byproducts,
   (e) releasing the hydrogen through the outlets of the lids of the containers, and
   (f) collecting the disintegrated pieces and the byproducts at the bottom of the containers.

17. The method as claimed in claim 16, wherein the metal content for metal hydride is selected from Sodium, Boron, Lithium, Potassium and magnesium with an addition aluminum powder, or any metal hydride capable of releasing hydrogen, preferably sodium hydride.

18. The method as claimed in claim 16, wherein the cylinders are connected in series for simultaneous disintegration of enhanced number of encapsulated metal hydrides for the production of hydrogen gas.

19. The method as claimed in claim 17, wherein the aluminum powder is in the range of 5-50%.

20. The method as claimed in claim 16, wherein the byproducts are NaOH and alumina.

21. The method as claimed in claim 16, wherein the reaction of metal hydride takes place under controlled pressure and temperature.

* * * * *